United States Patent [19]

Tanaka et al.

[11] Patent Number: 4,587,309

[45] Date of Patent: May 6, 1986

[54] PROCESS FOR PRODUCING POLYETHERESTERAMIDES

[75] Inventors: Chiaki Tanaka, Tokyo; Makoto Kondou; Yoshiyuki Yamamoto, both of Nagoya, all of Japan

[73] Assignee: Toray Industries, Inc., Tokyo, Japan

[21] Appl. No.: 724,611

[22] Filed: Apr. 18, 1985

[30] Foreign Application Priority Data

Apr. 27, 1984 [JP] Japan .................................. 59-83690

[51] Int. Cl.$^4$ .................... C08F 283/00; C08G 63/76; C08G 69/48; C08L 67/00
[52] U.S. Cl. .................................... 525/419; 525/425; 528/283; 528/285
[58] Field of Search ............... 528/283, 285, 312, 319; 525/419, 425

[56] References Cited

U.S. PATENT DOCUMENTS 3,796,691  3/1974  Chimura et al. ................ 528/302 X
4,207,410  6/1980  Burzin et al. ........................ 528/288

Primary Examiner—Lucille M. Phynes
Attorney, Agent, or Firm—Austin R. Miller

[57] ABSTRACT

The high polymerization degree polyetheresteramides without any gelated materials and with superior color tones are obtained in a short time through the polycondensing interaction carried out between (A) one or more than two polyamide forming components selected from lactams and aminocarboxylic acids as well as the salts of substantially-equal quantities of diamines and dicarboxylic acid and (B) the polyetherester forming components consisting of the substantially-equal quantities of dicarboxylic acids and poly(alkylene oxide) glycols in the presence of 0.001 to 0.5 percent by weight of the mixtures composed of antimony oxides/organic tin compounds at the ratios of 80/20 to 30/70 by weight and more preferably in the co-presence of 0.0005 to 0.5 percent by weight of phosphoric compounds.

7 Claims, No Drawings

PROCESS FOR PRODUCING POLYETHERESTERAMIDES

BACKGROUND OF THE INVENTION

The present invention relates to a process for producing high polymerization degree polyetheresteramides in a short time without causing any such troubles as gelation, color tone decrease and haze increase in the course of polycondensation.

An art of synthesizing polyamide elastomers by obtaining polyetheresteramides through the ester interconnection of poly(alkylene oxide) glycols by amide forming components and dicarboxylic acids has been developed and established as their industrial production process. It has already been disclosed in U.S. Pat. Nos. 4,230,838, 4,331,786, 4,332,920 and 4,207,410 as well as Japanese Laid-Open Patent Gazette No. 90017/1982 that tetraalkyl titanate and other titanium catalysts are effective for the polymerizing production of the polyetheresteramides. However, they do not sufficiently increase polymerization degree and increase polymer haze because they are readily inactivated by the water generated in the course of polymerization. If they are used in great quantities, therefore, they cause the troubles of generating gelated materials, decreasing color tones or reducing the heat resistance of the polymers. Their application quantity is therefore limited. Further, tetraalkyl zirconate and zirconium catalysts has been proposed among highly-active ones (U.S. Pat. No. 4,252,920). They, however, pose a serious problem of readily generating gelated materials. As described heretofore, the conventional catalysts used to produce the polyetheresteramides are not always satisfactory in this respect.

The inventors have studied the catalysts for obtaining high polymerization degree polymers in a short time without causing such troubles as gelation, color tone decrease and haze increase in the course of polycondensing production of the polyetheresteramides and found out that organic tin compounds and antimony oxides show very high polymerzation catalyzing activities and do not generate gelated materials.

Tin compounds and antimony oxides contribute to the production of the polymers satisfactory in both performances and quality. It has, however, been learned as necessary to ameliorate the yellow and grey tones given to the former and lattre respectively in some cases when the polymers are used for textiles and other colored goods, apart from the general industrial use.

In this connection the authors have attempted to decrease the ratio of the addition of tin and antimony catalysts and change its timing and studied what copolymer composition ratios readily generate color tones. Nevertheless, almost all the methods attempted and studied have not been effective in this respect. However, they have found that the systems obtained by mixing antimony oxides and organic tin compounds at specific ratios unexpectedly cause further increase in polymerizing activity and can produce nearly colorless, transparent polymers and worked out the present invention.

SUMMARY OF THE INVENTION

An object of the present invention is to provide a process for producing the polymers with high polymerization degrees and superior color tones.

Another object of the present invention is to provide a process for producing the polyetheresteramides in which polymerization progresses in a short time without generating gelated materials.

Namely, the present invention provides a process for producing the polyetheresteramides through the polycondensing interaction between (A) one or more than two polyamide forming components selected out of lactam and aminocarboxylic acid as well as the salts of substantially-equal quantities of diamines and dicarboxylic acids and (B) the polyetherester forming components consisting of the substantially-equal quantities of dicarboxylic acids and poly(alkylene oxide) glycols, which is characterized in that the polycondensation is carried out in the presence of 0.001 to 0.5 percents by weight per the polyetheresteramides of the mixtures composed of antimony oxides and organic tin compounds at the ratios of 80/20 to 30/70 by weight. Therein 0.0005 to 0.1 percent by weight of phosphoric compounds should preferably be caused to coexist with the mixtures.

DESCRIPTION OF THE PREFERRED EMBODIMENT

The antimony oxides according to the present invention include antimony trioxide, antimony tetraoxide, antimony pentoxide and their mixtures. The organic tin compounds include monoalkyls and monoallyl-substituted tin compounds such as mono-n-buthylmonohydroxytin oxide, mono-n-buthyltin triacetate, mono-n-buthyltin monooctylate, mono-n-buthyltin monoacetate, monophenyl monohydroxytin oxide, monotoluylmonohydroxytin oxide and monophenyltin triacetate, dialkyls and diallytin compounds such as dibuthyltin oxide, dibuthyltin dichloride, dibuthyltin dilaurate, dibuthyltin distearate, dibuthyltin maleate, dibuthyltin dibuthylate, dibuthyltin diacetate and diphenyltin oxide, and trialkyltin compounds such as tributhyltin phthalate and tributhyltin maleate. They, including such derivatives as cyclic trimers like mono-n-buthylmonohydroxytin oxide and the compounds of a plurality thereof for example, are generally called mono-n-buthylmonohydroxy monoxides. Particularly preferable among organic tin compounds are mono-n-buthylmonohydroxytin oxide, monobuthylmonohydroxytin monooctylate, dibuthyltin oxide and tributhyltin phthalate.

It is of key importance for the invention to use the mixtures at the specific ratios of 80/20 to 30/70, preferably 70/30 to 40/60, by weight of antimony oxides and organic tin compounds. Any higher ratios of the former or latter are not preferable because grey or yellow coloration occurs. Showing high catalyzing activities, the mixtures are effective for a wide range of polyetheresteramide copolymer compositions. Their recommendable addition ratios are 0.001 to 0.5 percent by weight per the polyetheresteramides. Any lower or higher ratios are not preferable because polymerization performance is not satsfactory or decrease occurs in melting stability, respectively.

Antimony oxides and organic tin compounds may be added at a time (as mixtures), or dividedly i.e. the former and latter may be supplied at the same time as raw materials or before the start of pressure-reduction polymerization. They are permitted to take any of powdery, slurry and solution forms. The latter two, however, are preferable for preventing the generation of antimony oxide and organic tin compound flocs.

The antimony oxide/organic tin compound combination catlyst systems according to the present invention strikingly differ from those of the conventional arts of the kind in that they show high polymerization performance and superior color tones and contain no gelated materials but cause slight color-phase variation depending on reaction conditions and copolymer compositions in some cases. This problem, however, is soluved by adding a small quantity of phosphoric compounds. They include phosphoric acid, phosphoric acid esters such as tributhyl, trimethyl, tioctyl, tributoxyethyl and di(2-ethylhexyl) phosphates, and acidic phosphoric-acid esters such as methyl, isodecyl and lauryl acid-phosphates. Their addition should be made at the ratios of preferably 0.0005 to 0.1, more preferably 0.001 to 0.05, percent by weight per the polyetheresteramides or of 1/20 to ⅓ to the total quantity of antimony oxides/organic tin compounds.

The polyamide forming components (A) of the polyetheresteramide segment copolymers according to the present invention include capro-, enanto-, dodecano- and undecano- and other lactams; aminocapronic, 11-aminoundecanic and 12-aminododecanic and other ω-aminocarboxylic acids; and the salts of diamine-dicarboxylic acid i.e. the precursors of nylon-6.6, 6.9, 6.10, 6.12, 11.6 and 12.6, PACM (paraaminocyclohexylmethane) 0.6 to 12. One or more than two as mixtures thereof are usable for some purposes. Preferable thereamong are caprolactam; 11-aminoundecanic and 12-aminododecanic acids; and nylon 6.6, 6.10, 6.12 and 11.6 salts.

The polyetherester forming components (B) of the soft segment of the polyetheresteramide segment copolymers, on the other hand, are composed of the substantially-equal mols of 4 to 20 carbon atom dicarboxylic acids and poly(alkylene oxide) glycols. The former include succinic, glutaric, adipic, pimelic, suberic, azelaic, sebacic, undecanedioic and dodecanedioic and other aliphatic dicarboxylic acids; terephtalic, isophtalic, phthalic, naphthalenedicarboxylic and other aromatic dicarboxylic acids; and 1.4-cyclohexane-dicarboxylic, dicyclohexyl-4,4'-dicarboxylic and other cycloaliphatic dicarboxylic acids. Preferable thereamong are terephthalic, isophtalic, dodecanedioic, sebacic and adipic acids. The latter include poly(ethylene oxide), poly(1,2- and 1,3-propylene oxide), poly(tetramethylene oxide) and poly(hexamethylene oxide) glycols, as well as ethylene—propylene oxide and ethylene oxide—tetrahydrofuran blocks or random copolymers. Particularly thereamong poly(tetramethylene oxide) glycol is suitable for the improvement in physical properties such as heat resistance, water resistance, mechanical strength and elastic recovery of the polyetheresteramides, while poly(ethylene oxide) glycol for the purposes requiring hydrophilicity (anti-static property, water solubility, water absorbability). The poly(alkylene oxide) glycols should have the mean molecular weights of preferably 300 to 5,000, more preferably 500 to 2,000. It is significant for obtaining high polymerization degree polymers to use the substantially-equal mols of dicarboxylic acids and poly(alkylene oxide) glycols. The former, however, evaporate and diffuse outside a reaction system depending on polycondensing conditions in some cases. It is, therefore, necessary to use then in excess. "Substantially-equal mols" according to the present invention, therefore, means that at least on the final stage of polycondensation.

The process for the polymerizing production of the polyetheresteramide segment copolymers according to the present invention comprises the steps of heating and stirring, in the presence of $N_2$ gas flow, the polyamide forming components (A) and polyetherester forming components (B) together with phosphoric compounds set in a reactor vessel to obtain homogeneous mixture solutions wherein heating is generally performed at the temperatures of 180° to 300° C., preferably of 230° to 260° C., for 10 to 120 minutes or, in some cases, with a pressure of 20 $Kg/cm^2G$ applied and reduced in the co-presence or non-presence of water, of adding a prescribed quantity of antimony oxide/organic tin compound mixtures, and of heating to the temperatures of preferably 200° to 300° C., more preferably 230° to 280° C., at the pressures less than 50 mmHg, preferably at a vacuum pressure of 5 mmHg according to a fixed temperature raising and pressure reduction program until completing polycondensation. The mono-substituted tin compounds of the polymerizing catalysts may be supplied at the same time as raw materials or before the start of pressure reduction; or the poly(alkylene oxide) glycols of the polyetherester forming components (B) may be supplied together with polymerizing catalysts before the start of pressure-reduced polymerization, not at the same time as other materials initially, or the carboxy-end amide prepolymers prepared from the dicarboxylic acids which are part of the polyamide forming components (A) and polyetherester forming components (B) may be subjected to polymerization together with poly(alkylene oxide) glycols and polymerizing catalysts.

The polycondensation time according to the present invention is required to be 30 minutes to 10 hours after the start of pressure reduction but adjustable to a proper value of 1 to 5 hours by varying polymerizing conditions. It depends mainly on the categories and copolymerization ratio of poly(alkylene oxide) glycols but is required to be sufficiently-long for obtaining the suitable polymerization degrees for the object molding elastomer materials of the present invention. The polymerization degrees correspond to the mean molecular weights more than 15,000, preferably 20,000 to 50,000, although they depend on copolymer compositions.

The polyetheresteramides according to the present invention are producible at almost all copolymer composition ratios. The weight ratio of polyamide hard segment:polyetherester soft segment suitable for practical purposes, however, is 99 to 5:1 to 95, preferably 80 to 10:20 to 90.

The polyetheresteramide segment copolymers according to the present invention permit the addition of oxidation preventives, thermal decomposition preventives, ultraviolet ray absorbors and other heat- and light-resistant stabilizers before or after polymerization and, in order to improve their products in properties for some uses and purposes, they permit the addition desirably of hydrolysis resistance improvers, colorants, antistatic agents, conductors, flame retardants, reinforcers, fillers, lubricants, nuclear agents, mold-release agents, plasticizers, adhesive auxiliaries and adhesive compounds.

The present invention will be described in further details in connection with its examples hereinafter although it is not limited thereto. Therein "parts" means by weight.

EXAMPLE 1

The quantity 49.11 parts of ω-aminododecanic acid, 8.08 parts of terephthalic acid and 48.67 parts of poly(tetramethylene oxide) glycol which have mean molecular weight of 1000 were set together with 0.2 part of "IRGANOX" 1098 (the trade name of an heat stabilizer preventive made by Ciba-Geigy) and 0.005 part of trimenthyl phosphate in a reactor vessel with helical ribbon stirring blades and kept heated and stirred at a temperature of 260° C. in the presence of $N_2$ gas flow for one hour to obtain a transparent, homogeneous solution. After adding the 10 percent 1,4-buthanediol slurry of 0.015 part of antimony trioxide and 0.015 part of mono-n-buthylmonohydroxytin oxide, the solution was set under the polymerization conditions of 60 minutes, 260° C. and 0.5 mmHg according to a temperature raising and pressure reduction program. A colorless, transparent melted polymer with a stirring torque of 8.0 kg.cm/22 rpm was obtained through the 2 hours and 15 minutes' polymerization thereunder, which crystallized to cause white turbidity when discharged into water as gut. The polyetheresteramide thus obtained showed a relative viscosity (ηr) of 2.10 and a melt index of 4.0 gr./10 minutes that were measured at a concentration of 0.5 percent at a temperature of 25° C. in ortho-chlorophenol and at a temperature of 230° C. with 2,160 gr. loading, respectively. The former was enough for the extrusion molding of tubes and if molding temperature was controlled for blow molding. No gel was found out at all over a distance of 50 cm in the microscopic observation of monofilaments with a diameter of about 0.1 mm that was taken out of a melt indexer.

The sheets made by the press molding of pellets showed the following when their mechanical properties were measured according to ASTM Standards.

| | |
|---|---|
| Tensile Modulus | 560 Kg/cm² |
| Shore Hardness | 40 D |
| Tensile Strength at Break | 600 Kg/cm² |
| Elongation at Break | 990% |
| Elastic Recovery (50% elong.) | 88% |

EXAMPLES 2 TO 6, COMPARATIVE EXAMPLES 1 TO 7

Polymerization performance and polymer characteristics were evaluated with polycondensation carried out under quite the same conditions as Example 1 except that the kinds and quantities of the catalysts added were changed. The results of this evaluation are shown in Table 1.

TABLE 1

| | Catalysts | | Addition ratio of trimethyl-phosphate (parts) | Polymerization time (hr:min) | Torque reached (Kg · cm) | ηr | Color tone | Gel (pcs/50 cm) | Tensile characteristics | |
|---|---|---|---|---|---|---|---|---|---|---|
| | Kinds | Addition ratio (parts) | | | | | | | Strength (kg/cm) | Elongation (%) |
| Example 1 | Antimony trioxide($K_1$)/ monobuthylmonohydroxytin oxide($K_2$) | 0.015/0.015 | 0.005 | 2:15 | 8.0 | 2.10 | Colorless | 0 | 600 | 990 |
| Example 2 | $K_1/K_2$ | 0.03/0.03 | 0.01 | 2:40 | 8.0 | 2.10 | Colorless | 0 | 610 | 1000 |
| Example 3 | $K_1/K_2$ | 0.05/0.05 | 0.03 | 2:50 | 8.0 | 2.10 | Colorless | 0 | 620 | 1030 |
| Example 4 | $K_1/K_2$ | 0.05/0.05 | — | 1:00 | 8.0 | 2.07 | Light grey | 0 | 580 | 950 |
| Example 5 | $K_1/K_2$ | 0.03/0.03 | — | 1:30 | 8.0 | 2.08 | Light grey | 0 | 590 | 970 |
| Example 6 | $K_1/K_2$ | 0.020/0.010 | 0.01 | 3:50 | 8.0 | 2.11 | Colorless | 0 | 650 | 1100 |
| Comparative Example 1 | Tetrabuthyl titanate | 0.03 | — | 6:30 | 8.0 | 2.10 | Colorless | 1 | 630 | 1050 |
| Comparative Example 2 | Tetrabuthyl titanate | 0.1 | — | 4:20 | 8.0 | 2.11 | Light yellow | 2 | 650 | 1100 |
| Comparative Example 3 | Tetrabuthyl zirconate | 0.03 | — | 2:50 | 8.0 | 2.08 | Colorless | 6 | 590 | 970 |
| Comparative Example 4 | Tetrabuthyl zirconate | 0.03 | 0.01 | 4:10 | 8.0 | 2.10 | Colorless | 20 | 610 | 1000 |
| Comparative Example 5 | Magnecium acetate | 0.06 | — | 8:00 | 0.6 | 1.41 | Colorless | 1 | 270 | 400 |
| Comparative Example 6 | Calcium acetate | 0.06 | — | 8:00 | 0.9 | 1.46 | Light grey | 0 | 290 | 440 |
| Comparative Example 7 | Germanium oxide | 0.06 | — | 8:00 | 1.3 | 1.55 | Colorless | 0 | 330 | 540 |

EXAMPLES 7 TO 11, COMPARATIVE EXAMPLES 8–13

Both-end carboxylated N-12 prepolymers were obtained through the closed-cycle polycondensation of laurolactam in the presence of terephthalic acid. They were confirmed by an ordinary nylon end-group determining method to be both-end carboxyl groups. The quantity 30.0 parts of the dicarboxyl end N-12 prepolymers with a mean molecular weight of 437 and 70.0 parts of the poly(tetramethylene oxide) glycols with a mean molecular weight of 1,020 were polycondensed using the catalysts and phosphoric compounds shown in Table 2.

TABLE 2

| | Catalysts | | Phosphoric compounds | | Polymerization time (hr:min) | Torque reached (kg · cm) | Color tone |
|---|---|---|---|---|---|---|---|
| | Kinds | Addition ratio (parts) | Kinds | Addition ratio (parts) | | | |
| Example 7 | Antimony trioxide($K_1$)/ monobuthylmonohydroxytin oxide($K_2$) | 0.025/0.025 | Trimethyl phosphate | 0.005 | 2:50 | 8.0 | Colorless |

TABLE 2-continued

|  | Catalysts | | Phosphoric compounds | | Polymerization time (hr:min) | Torque reached (kg · cm) | Color tone |
| --- | --- | --- | --- | --- | --- | --- | --- |
|  | Kinds | Addition ratio (parts) | Kinds | Addition ratio (parts) |  |  |  |
| Example 8 | $K_1/K_2$ | 0.025/0.025 | Trimethyl phosphate | 0.01 | 3:30 | 8.0 | Colorless |
| Example 9 | $K_1/K_2$ | 0.025/0.025 | Phosphoric acid | 0.01 | 3:10 | 8.0 | Colorless |
| Example 10 | $K_1$/tributyltin fumarata | 0.025/0.025 | Phosphoric acid | 0.01 | 3:00 | 8.0 | Colorless |
| Example 11 | $K_1$/dibuthyltin oxide | 0.025/0.025 | Phosphoric acid | 0.01 | 3:50 | 8.0 | Colorless |
| Comparative example 8 | $K_1$ | 0.05 | — | — | 2:30 | 8.0 | Grey |
| Comparative example 9 | $K_2$ | 0.05 | — | — | 2:50 | 8.0 | Yellow |
| Comparative example 10 | $K_1$ | 0.05 | Phosphoric acid | 0.005 | 3:30 | 8.0 | Light grey |
| Comparative example 11 | $K_1$/Tetrabuthyl titanate | 0.03/0.03 | Phosphoric acid | 0.2 | 8:00 | 3.5 | Colorless |
| Comparative example 12 | $K_1$/tetrabuthyl zirconate | 0.03/0.03 | — | — | 4:20 | 8.0 | Grey |
| Comparative example 13 | $K_1/K_2$ | 0.3/0.3 | — | — | 2:00 | 8.0 | Dark grey |

EXAMPLE 12

The quantity 17.4 parts of adipic acid-hexamethylene diamine salt, 69.9 parts of the polyethylene glycols with a mean molecular weight of 600, and 19.3 parts of isophthalic acid were set together with 0.3 parts of "IRGANOX" 1098 and 0.02 part of trimethyl phosphate in a polymerization reactor vessel and kept heated and stirred at a temperature of 240° C. in the presence of $N_2$ gas flow for one hour. After adding a total of 0.1 part of antimony trioxide and monobuthylmonohydroxytin oxide at the ratios shown in Table 3, the solution obtained was set under the polymerization conditions of 255° C. and 0.5 mmHg according to a temperature raising and pressure reduction program. Polymerization was continued thereunder until reaching target torque 5 Kg.cm/22 rpm and if this is not performed stopped in 8 hours. The results of this are shown in Table 3.

The table also shows the results of the addition of 0.1 part of other catalysts for comparison.

TABLE 3

| No. | Antimony trioxide/ monobuthylmonohydroxytin oxide (ratio by weight) | Polymerization time (hr:min) | Torque reached (kg · cm) | Color tone |
| --- | --- | --- | --- | --- |
| 1 | 100/0 | 5:00 | 5.0 | Dark grey |
| 2 | 80/20 | 4:35 | 5.0 | Light grey |
| 3 | 60/40 | 4:15 | 5.0 | Nearly colorless |
| 4 | 50/50 | 4:20 | 5.0 | Nearly colorless |
| 5 | 40/60 | 4:50 | 5.0 | Light yellow |
| 6 | 20/80 | 6:00 | 5.0 | Yellow |
| 7 | 0/100 | 8:00 | 2.5 |  |
| 8 | Tetrabuthyl titanate | 8:00 | 1.2 | Light yellow |
| 9 | Tetrabuthyl zirconate | 8:00 | 1.0 | Light yellow |
| 10 | Calcium acetate | 8:00 | 0.5 | Light yellow |

EXAMPLE 13

The quantity 50.7 parts of ε-aminocapronic acid, 56.5 parts of the ethylene oxide-tetramethylene oxide random copolymer (copolymerization ratio 50/50 by weight) with a mean molecular weight of 1,800 and 4.7 parts of adipic acid were set together with 0.3 part of "IRGANOX" 1098 and 0.01 part of phosphoric acid in a polymerization reactor vessel and kept heated and stirred at a temperature of 240° C. in the presence of $N_2$ gas flow for one hour. After adding 0.05 part of antimony trioxide and 0.05 part of monobuthylmonohydroxytin oxide, the solution obtained was set under the polymerization conditions of 250° C. and 0.3 mmHg according to a temperature raising and pressure reduction program. The target torque of 5 Kg.cm/22 rpm was reached in 4 hours and 10 minutes. The polymer obtained was nearly-colorless.

What is claimed is:

1. The processes for producing polyetheresteramides wherein one or more than two polyamide forming components (A) selected from lactams and aminocarboxylic acids as well as the salts of the substantially-equal quantities of diamines and dicarboxylic acids and (B) the polyetherester forming components consisting of substantially-equal quantities of dicarboxylic acids and poly(alkylene oxide) glycols are subjected to polycondensation while melted, which is characterized in that said polycondensation is carried out in the presence of 0.001 to 0.5 percent by weight per said polyetheresteramides of the mixtures composed of antimony oxides/organic tin compounds at the ratios of 80/20 to 30/70 by weight.

2. A process for producing polyetheresteramides, as claimed in claim 1, wherein said polycondensation is carried out in the co-presence of 0.0005 to 0.1 percent of phosphoric compounds.

3. A process for producing polyetheresteramides, as claimed in claim 1, wherein said lactams and aminocarboxylic acids as well as the salts of the substantially-equal quantities of said diamines and dicarboxylic acids are ε-caprolactam, ε-aminocapronic acid, 10-aminododecanic acid, 11-aminoundecanic acid, 12-aminododecanic acid and the salt of hexamethylenediamine and adipic acid.

4. A process for producing polyetheresteramides, as claimed in claim 1, wherein said poly(alkylene oxide) glycols have the molecular weights of 500 to 2,000.

5. A process for producing polyetheresteramides, as claimed in claim 1, wherein said antimony oxides compound is antimony trioxide.

6. A process for produicng polyetheresteramides, as claimed in claim 1, wherein said organic tin compound is mono-n-buthylmonohydroxytin oxide.

7. A process for producing polyetheresteramides, as claimed in claim 2, wherein said phosphoric compounds are phosphoric acid and trimethyl phosphate.

* * * * *